(12) United States Patent
Gizdarski et al.

(10) Patent No.: US 11,288,428 B1
(45) Date of Patent: Mar. 29, 2022

(54) INTEGRATED CIRCUIT DESIGN MODIFICATION FOR LOCALIZATION OF SCAN CHAIN DEFECTS

(71) Applicant: Synopsys, Inc., Mountain View, CA (US)

(72) Inventors: Emil I. Gizdarski, Cupertino, CA (US); Fadi Maamari, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/085,830

(22) Filed: Oct. 30, 2020

Related U.S. Application Data

(60) Provisional application No. 62/928,971, filed on Oct. 31, 2019.

(51) Int. Cl.
*G06F 30/333* (2020.01)
*G01R 31/3183* (2006.01)
*G01R 31/3185* (2006.01)
*G06F 117/02* (2020.01)

(52) U.S. Cl.
CPC ..... *G06F 30/333* (2020.01); *G01R 31/31835* (2013.01); *G01R 31/318566* (2013.01); *G01R 31/318307* (2013.01); *G06F 2117/02* (2020.01)

(58) Field of Classification Search
None
See application file for complete search history.

(56) References Cited

U.S. PATENT DOCUMENTS

| | | | | |
|---|---|---|---|---|
| 10,156,607 B2* | 12/2018 | Goel | | G01R 31/318536 |
| 10,386,413 B2* | 8/2019 | Payne | | H03K 3/0375 |
| 11,041,906 B2* | 6/2021 | Huang | | G01R 31/318544 |

OTHER PUBLICATIONS

R. Guo et al., "A Complete Test Set to Diagnose Scan Chain Failures," 2007 IEEE Int'l Test Conference, Paper 7.2, pp. 1-10. (Year: 2007).*

* cited by examiner

*Primary Examiner* — Leigh M Garbowski
(74) *Attorney, Agent, or Firm* — Park, Vaughan, Fleming & Dowler LLP; Laxman Sahasrabuddhe

(57) ABSTRACT

An integrated circuit (IC) design comprising a scan chain may be received, where stimulus values may be scanned-in and response values may be scanned-out through a scan path in the scan chain, where the scan path may include a first scan cell and a second scan cell such that the first scan cell is downstream with respect to the second scan cell. The scan chain may be modified to enable observation of a 0 and a 1 value in the first scan cell in presence of a defect in the second scan cell, or observation of a 0 and a 1 value in the second scan cell in presence of a defect in the first scan cell.

20 Claims, 11 Drawing Sheets

Receive an IC design which includes a scan chain, where test values may be scanned-in and response values may be scanned-out through a scan path in the scan chain, where the scan path includes a first scan cell and a second scan cell, and where the first scan cell is downstream with respect to the second scan cell ⎯ 852

Modify the scan chain to enable observation of a 0 and a 1 value in the first scan cell in presence of a defect in the second scan cell, or observation of a 0 and a 1 value in the second scan cell in presence of a defect in the first scan cell ⎯ 854

|          | No Fault | 202 is SA1 | 204 is SA1 | 206 is SA1 | 208 is SA1 |
|----------|----------|------------|------------|------------|------------|
| Scan-in  | 00000    | 00000      | 00000      | 00000      | 00000      |
| Load     | 00000    | 0*1111*    | 00*111*    | 000*11*    | 0000*1*    |
| Capture  | X0000    | X*1111*    | X0*111*    | X00*11*    | X000*1*    |
| Scan-out | X00000   | *111111*   | *111111*   | *111111*   | *111111*   |

FIG. 3A

|          | No Fault | 202 is SA0 | 204 is SA0 | 206 is SA0 | 208 is SA0 |
|----------|----------|------------|------------|------------|------------|
| Scan-in  | 11111    | 11111      | 11111      | 11111      | 11111      |
| Load     | 11111    | 1*0000*    | 11*000*    | 111*00*    | 1111*0*    |
| Capture  | X1111    | X*0000*    | X1*000*    | X11*00*    | X111*0*    |
| Scan-out | X11111   | *000000*   | *000000*   | *000000*   | *000000*   |

FIG. 3B

|          | No Fault | 202 is SA1 | 204 is SA1 | 206 is SA1 | 208 is SA1 |
|----------|----------|------------|------------|------------|------------|
| Scan-in  | 01010    | 01010      | 01010      | 01010      | 01010      |
| Load     | 00000    | 0*1010*    | 00*101*    | 000*10*    | 0000*1*    |
| Capture  | X0000    | X*1101*    | X0*110*    | X0*111*    | X000*1*    |
| Scan-out | X10100   | X*01110*   | X*11001*   | X*00010*   | X*11111*   |

FIG. 3C

|          | No Fault | 202 is SA0 | 204 is SA0 | 206 is SA0 | 208 is SA0 |
|----------|----------|------------|------------|------------|------------|
| Scan-in  | 10101    | 11111      | 11111      | 11111      | 11111      |
| Load     | 11111    | 1*0101*    | 11*010*    | 111*01*    | 1111*0*    |
| Capture  | X1111    | X*0010*    | X1*001*    | X1*000*    | X111*0*    |
| Scan-out | X01011   | X*10001*   | X*00110*   | X*11101*   | X*00000*   |

FIG. 3D

|  | No Fault | 202 is STR | 204 is STR | 206 is STR | 208 is STR |
|---|---|---|---|---|---|
| Scan-in | 01010 | 01010 | 01010 | 01010 | 01010 |
| Load | 00000 | 01010 | 0010X | 00010 | 0000X |
| Capture | X0000 | X0101 | X0010 | X0001 | X0000 |
| Unload | X0000 | X0101 | X0010 | X1001 | X0100 |
| Scan-out | X10100 | X11110 | X1000X | X00110 | X1110X |

|  | No Fault | 202 is STF | 204 is STF | 206 is STF | 208 is STF |
|---|---|---|---|---|---|
| Scan-in | 10101 | 10101 | 10101 | 10101 | 10101 |
| Load | 11111 | 10101 | 1101X | 11101 | 1111X |
| Capture | X1111 | X1010 | X1101 | X1110 | X1111 |
| Unload | X1111 | X1010 | X1101 | X0110 | X1011 |
| Scan-out | X01011 | X00001 | X0111X | X11001 | X0001X |

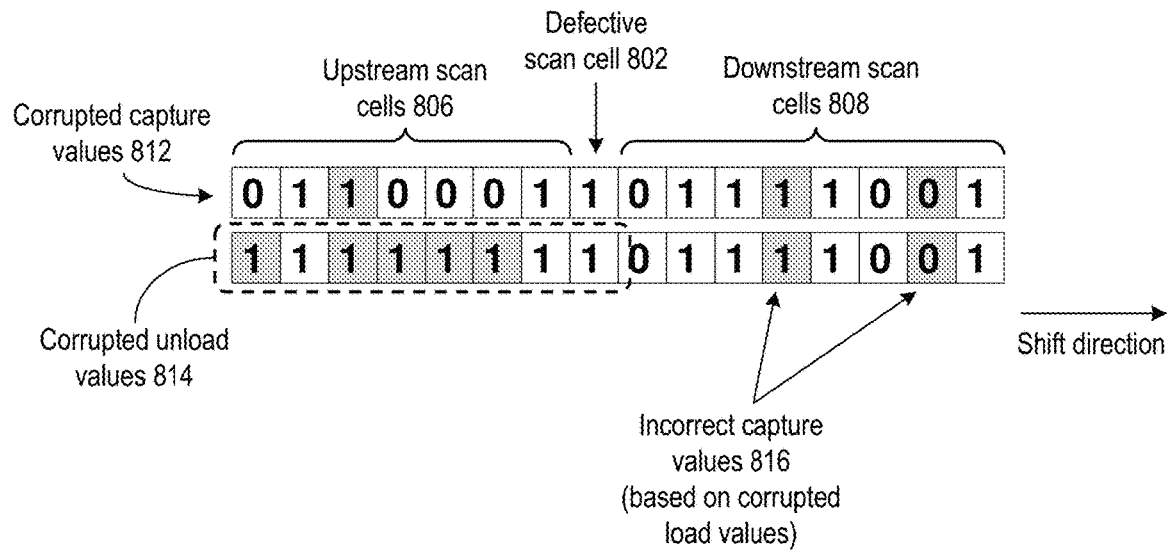

FIG. 8B

Receive an IC design which includes a scan chain, where test values may be scanned-in and response values may be scanned-out through a scan path in the scan chain, where the scan path includes a first scan cell and a second scan cell, and where the first scan cell is downstream with respect to the second scan cell ⎯ 852

Modify the scan chain to enable observation of a 0 and a 1 value in the first scan cell in presence of a defect in the second scan cell, or observation of a 0 and a 1 value in the second scan cell in presence of a defect in the first scan cell ⎯ 854

FIG. 8C

INTEGRATED CIRCUIT DESIGN MODIFICATION FOR LOCALIZATION OF SCAN CHAIN DEFECTS

RELATED APPLICATION

This application claims the benefit of U.S. Provisional Application Ser. No. 62/928,971, filed on 31 Oct. 2019, the contents of which are herein incorporated by reference in their entirety for all purposes.

TECHNICAL FIELD

The present disclosure generally relates to integrated circuit (IC) design and test. More specifically, the present disclosure relates to localization of scan chain defects in an IC design.

BACKGROUND

Advances in process technology and an increasing demand for computing and storage have fueled an increase in the size and complexity of IC designs. These advances can be attributed to improvements in semiconductor design and manufacturing technologies which have made it possible to integrate tens of millions of devices onto a single chip.

Testing IC designs is important to ensure that the IC designs operate as desired. Design for test (DFT) circuitry may be included in IC designs to facilitate testing of IC chips. DFT circuitry may include scan chains that may be used to scan in test stimuli and scan out test responses. Each scan chain may include a chain of scan cells, and each scan cell may include a register (e.g., a flip-flop) and a multiplexer.

SUMMARY

Some embodiments described herein may receive an IC design that includes a scan chain, where stimulus values may be scanned-in and response values may be scanned-out through a scan path in the scan chain, where the scan path may include a first scan cell and a second scan cell such that the first scan cell is downstream with respect to the second scan cell. The embodiments may modify the scan chain to enable (i) observation of a 0 and a 1 unload value in the first scan cell in presence of a defect in the second scan cell, or (ii) observation of a 0 and a 1 load value in the second scan cell in presence of a defect in the first scan cell.

Specifically, some embodiments may modify the scan chain by (1) adding at least one inverter to the scan path in the scan chain, (2) adding a control point to provide a reset signal to a register in the scan path, (3) adding a control point to provide a set signal to a register in the scan path, (4) adding a control point to disable clock gating circuitry which gates a clock signal of one or more registers in the scan path, wherein disabling the clock gating circuitry ensures that the one or more registers in the scan path perform a capture operation in the presence of a scan chain defect, (5) adding a first control point to provide a reset signal to a register in the scan path and adding a second control point to provide a set signal to the register in the scan path, and/or (6) adding a control point to provide a reset signal and a set signal to alternate registers in the scan path.

Some embodiments may modify the scan chain in the following order: (1) add a control point to disable clock gating circuitry which gates a clock signal of one or more registers in the scan path, (2) add one or more inverters to the scan path in the scan chain, and (3) add a control point to provide a reset or a set signal to a register in the scan path.

BRIEF DESCRIPTION OF THE FIGURES

The disclosure can be understood based on the detailed description given below and the accompanying figures. The figures, examples and embodiments are for illustrative purposes, and do not limit the scope of the disclosure. Furthermore, the figures are not necessarily drawn to scale.

FIGS. 3A-3F illustrates scan chain values before and after adding inverters in accordance with some embodiments disclosed herein.

FIGS. 4A-4E illustrate techniques for increasing scan chain resolution in accordance with some embodiments disclosed herein.

FIGS. 8A-8B illustrate a scan chain defect localization process in accordance with some embodiments disclosed herein.

FIG. 8C illustrates a process for improving resolution of a scan chain in accordance with some embodiments disclosed herein.

DETAILED DESCRIPTION

Figure 1:
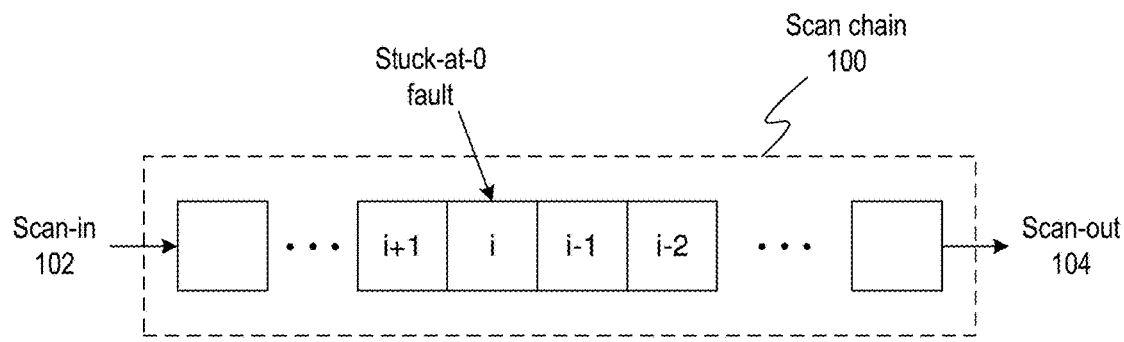
FIG. 1 illustrates an example of indistinguishable faults in a scan chain in accordance with some embodiments disclosed herein.

An IC chip that includes DFT circuitry may be tested by applying test patterns (which may be generated by using Automatic Test Pattern Generation (ATPG)) to the IC chip, and comparing responses generated by the IC chip with expected responses. A test fails when a response outputted by the IC chip does not match an expected response. If a defect exists in a scan cell, it is desirable to uniquely identify the defective scan cell, and this process or this ability is known as localization of scan chain defects.

The term "resolution" refers to the extent to which a scan chain enables localization of scan chain defects to specific scan cells based on test responses. A scan chain is said to have a low resolution if the scan chain does not enable unique localization of a defective scan cell when a defect exists in the scan chain. Improving or increasing scan chain resolution refers to modifying the scan chain so that the modified scan chain enables unique localization of a defective scan cell when a defect exists in the scan chain. Chain defects may be classified into the following fault types based on the defect behavior: stuck-at, slow, and fast. The fault types model (or specify) the defect behavior for purposes of ATPG and diagnosis. A particular defect may cause different fault types depending on how the defect affects the behavior of the scan chain.

Existing design-for-diagnosis (DFD) techniques for improving resolution of scan chain defects may be incomplete, may cause an increase in routing congestion, and/or may require special enhancements to the ATPG process.

Embodiments described herein feature DFD techniques for localization of scan chain defects. One technique disclosed herein may be used in IC design scenarios which do not have an overhead constraint (hereinafter referred to as a "test IC design scenario"), and another technique may be used in IC design scenarios which have an overhead constraint (hereinafter referred to as a "production IC design scenario"). The term "overhead constraint" refers to a constraint on the amount of additional DFD circuitry that can be added to the IC design.

Specifically, in the test IC design scenario, the IC design may be modified by (i) adding inverters in the scan path, and/or (ii) adding set and reset inputs for each scan cell. These design modifications may enable one defect per scan chain to be uniquely localized (i.e., the defect to the scan cell that is closest to the scan chain output) based on two test patterns in the presence of multiple chain defects.

In the production IC design scenario, a set of scan chains may be identified for modification, and one or more of the following design modifications may be applied to the identified scan chains: (i) disabling clock gating to ensure a capture operation occurs even in the presence of chain defects, (ii) adding inverters in the scan path, and/or (iii) adding set and reset inputs for a scan cell. These design modifications may enable unique localization of a defective scan cell that is the closest to the scan chain output in the presence of multiple chain defects. In addition, a given design modification may be associated with a cost function which measures an amount of DFD circuitry that is added to implement the design modification.

Advantages of DFD techniques disclosed herein include, but are not limited to, uniquely localizing scan chain defects without causing routing congestion problems and without using special enhancements to the ATPG process.

FIG. 1 illustrates an example of indistinguishable faults in a scan chain in accordance with some embodiments disclosed herein.

Each block in scan chain 100 represents a scan cell. Values are scanned-in from scan-in 102 terminal, and are scanned-out from scan-out 104 terminal. A stuck-at-0 fault may exist in the i-th scan cell, i.e., the fault causes a load value of 0 to exist in the i-th scan cell. This fault also causes a load value of 0 to exist in the i-th scan cell and in its downstream scan cells (i.e., (i−1)-th scan cell, and so forth), and causes an unload value 0 to exist in the i-th scan cell and its upstream scan cells (i.e., (i+1)-th scan cell, and so forth).

Unloading a 0 value and a 1 value from a particular scan cell for two different patterns is evidence that the scan cell is fault-free, i.e., the stuck-at fault does not exist in this scan cell. Stuck-at-0 faults in the i-th scan cell and the (i−1)-th scan cell are indistinguishable if both faults produce the same test response for any test pattern. Embodiments disclosed herein can distinguish indistinguishable faults in the original IC design by performing specific design modifications.

Figure 2A:
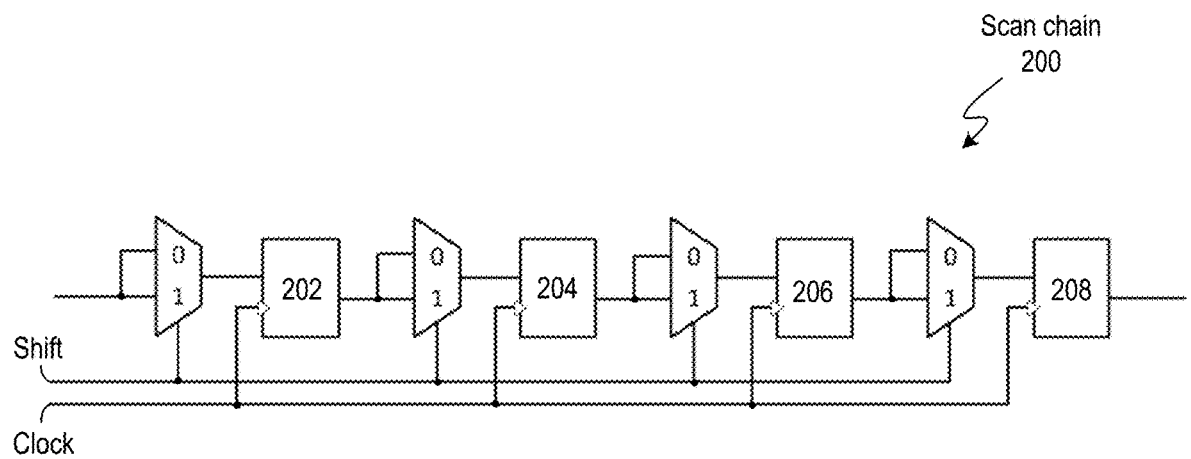
FIGS. 2A-2B illustrates a technique to increase scan chain resolution in accordance with some embodiments disclosed herein.
Figure 2B:
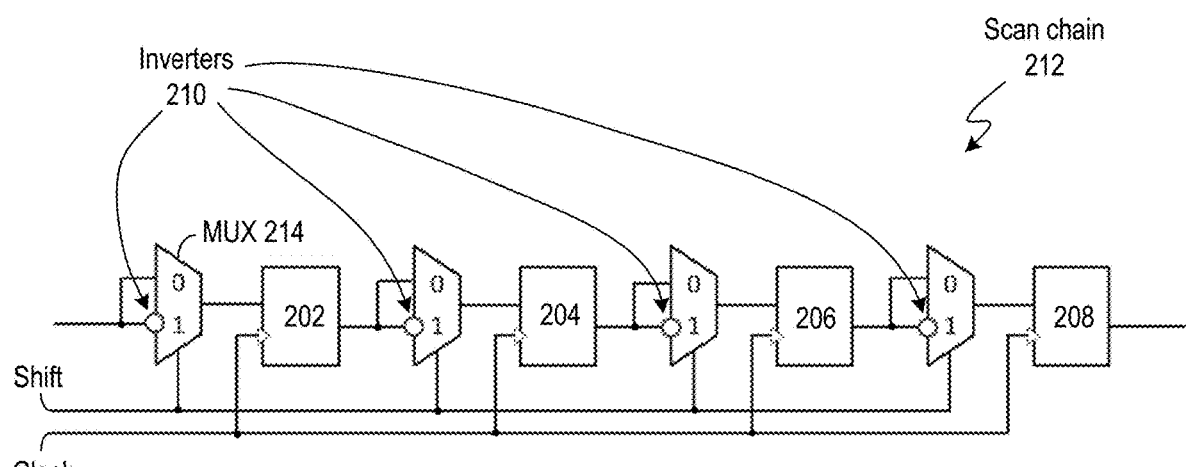

FIGS. 2A-2B illustrates a technique to increase scan chain resolution in accordance with some embodiments disclosed herein. As shown in FIG. 2A, scan chain 200 includes scan cells 202, 204, 206, and 208. As shown in FIG. 2B, scan chain resolution can be increased by adding inverters 210 to the scan chain path of scan chain 200, thereby obtaining scan chain 212. In this disclosure, an inverter is depicted by an unfilled circle at an input of a multiplexer of the scan cell. For example, the unfilled circle at the lower input of multiplexer 214 depicts one of the inverters in inverters 210.

FIGS. 3A-3F illustrates scan chain values before and after adding inverters in accordance with some embodiments disclosed herein. In the example illustrated in FIGS. 3A-3F, the following two patterns are used to localize the scan chain defect:

Pattern 1: load value <00000>, apply capture clock pulse, and unload value <00000>.

Pattern 2: load value <11111>, apply capture clock pulse, and unload value <11111>.

FIGS. 3A-3B illustrate the load values, capture values, and scan-out values when no fault exists in the scan chain, and when a stuck-at-1 fault (FIG. 3A) or a stuck-at-0 fault (FIG. 3B) exists in scan cells 202, 204, 206, and 208 in scan chain 200. Note that the last scan-out value is equal to the load value of scan cell 208, i.e., the closest scan cell to the scan chain output. As shown in FIG. 3A, stuck-at-1 faults ("SA1") in scan cells 202, 204, 206, and 208 are indistinguishable from each other because all of these faults produce the same test response <111111>. Likewise, as shown in FIG. 3B, stuck-at-0 faults ("SA0") in scan cells 202, 204, 206, and 208 are also indistinguishable from each other because all of these faults produce the same test response <000000>. Other fault types (such as slow and fast scan chain defects) in scan cells 202, 204, 206, and 208, are also indistinguishable from each other because the faults produce the same test response.

In FIGS. 3A-3F, incorrect scan cell values are italicized. For example, in FIG. 3A, the value "01111" in the cell corresponding to the "Load" row and "202 is SA1" column indicates that the "1" values are incorrect. The correct values are "00000" as shown in the cell corresponding to the "load" row and "No Fault" column. The notation "X" in FIGS. 3A-3F represents a don't care value, i.e., it does not matter whether the value is a "0" or a "1."

FIGS. 3C-3D illustrate the load values, capture values, and scan-out values when no fault exists in the scan chain, and when a stuck-at-1 fault (FIG. 3C) or a stuck-at-0 fault (FIG. 3D) exists in scan cells 202, 204, 206, and 208 in scan chain 212. The last scan-out value is equal to the load value of scan cell 208, i.e., the closest scan cell to the scan chain output. As shown in FIGS. 3C-3D, after the application of the two-pattern test, all stuck-at faults can be distinguished because they produce different test responses.

Figures 3E, 3F, 4A:
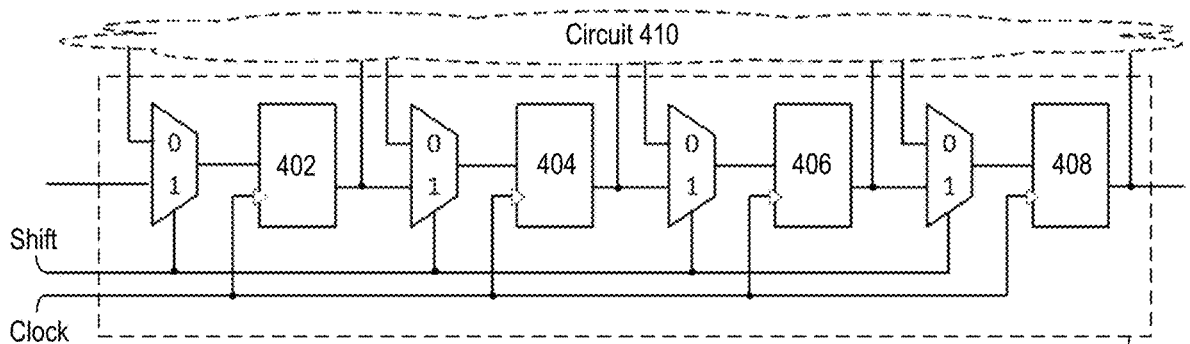

FIGS. 3E-3F illustrate the load values, capture values, unload values, and scan-out values when for slow-to-rise "STR" (FIG. 3E) and slow-to-fall "STF" (FIG. 3F) faults exist scan cells 202, 204, 206, and 208 in scan chain 212. As shown in FIGS. 3E-3F, after the application of the two-pattern test, all slow-to-rise or slow-to-fall faults can be distinguished because they produce different test responses. A slow-to-rise fault exists in a scan cell when the output of the scan cell takes longer than a maximum allowed delay to transition from a "0" value to a "1," which may cause the next scan cell to receive a "0" value instead of a "1" value at its input. Likewise, a slow-to-fall fault exists in a scan cell when the output of the scan cell takes longer than a maximum allowed delay to transition from a "1" value to a "0," which may cause the next scan cell to receive a "1" value instead of a "0" value at its input. FIGS. 3A-3F show that adding inverters in the scan path may have a significant impact on scan chain resolution.

In this disclosure, the term "scan-in values" refers to the stimulus values that are shifted into the scan chain during shift operation. The term "load values" refers to the actual values that are loaded into the scan cells, which may include effects of any scan cell faults and effects of any circuitry (e.g., inverters) that is added to the scan path. The circuit under test (e.g., circuit 410 in FIG. 4A below) can receive one or more capture clock pulses to generate values based on the load values during a capture operation. The term "captured values" corresponds to the actual values that are stored in the scan cells at the end of the capture operation. The term "unload values" refers to the capture values stored in the scan cells after the capture operation, which may include effects of scan cell faults. The unload values can be shifted out from the scan chain during a shift operation, and the shifted out values are referred to as the "scan-out values." The scan-out values may include effects of any circuitry (e.g., inverters) that is added to the scan path. The observation is based on the scan-out values.

FIGS. 4A-4E illustrate techniques for increasing scan chain resolution in accordance with some embodiments disclosed herein. Specifically, FIGS. 4A-4E illustrate how scan chain resolution can be improved based on adding inverters in the scan path and/or adding control points such that all scan cells can be independently set to desired values.

Scan cells 402, 404, 406, and 408 in FIG. 4A are part of a scan chain that is electrically coupled to circuit 410, which implements the functionality of the IC design. When the shift signal is "0," the multiplexers in each scan cell couple an output in circuit 410 with the input of the scan register, and when the shift signal is "1," the multiplexers couple the scan cells into a chain so that values can be scanned into the scan chain or scanned out of the scan chain.

Figure 4B:
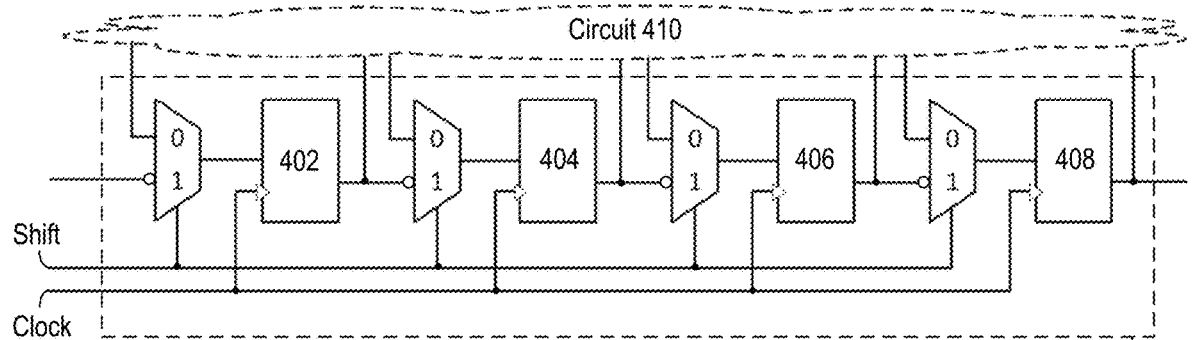

FIG. 4B illustrates a scan chain in which inverters are added to the scan path to increase scan chain resolution in accordance with some embodiments disclosed herein. An inverter has been added to the multiplexer input corresponding to the "1" shift signal, which corresponds to the scan path (i.e., the signal path when the scan cells are coupled in a chain). Scan chain 412 includes inverters in the scan path, which increases the scan chain resolution as explained above.

Figure 4C:
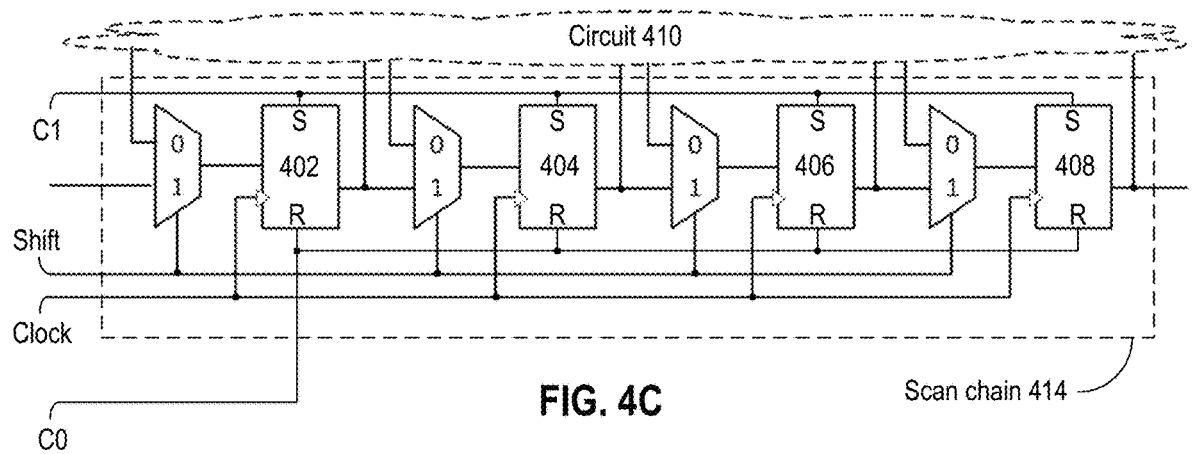

FIG. 4C illustrates scan chain in which set and reset inputs of scan registers are used to increase scan chain resolution in accordance with some embodiments disclosed herein. In scan chain 414, control point "C0" can be electrically connected to the reset inputs of the scan registers in scan cells 402, 404, 406, and 408. Control point "C1" can be electrically connected to the set inputs of the scan registers in scan cells 402, 404, 406, and 408. Control points "C0" and "C1" can be used to reset and set the values stored in the scan registers, thereby increasing scan chain resolution.

Figure 4D:
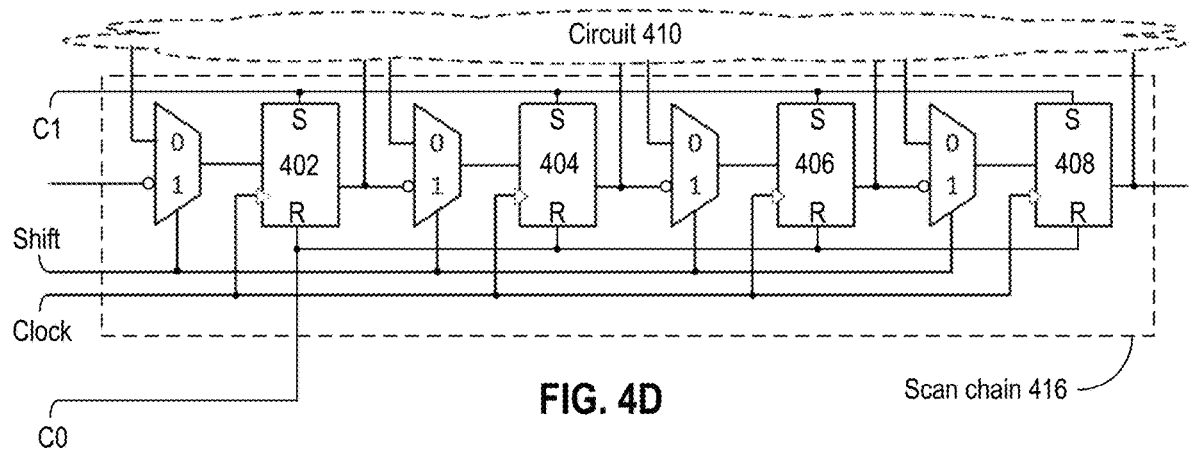

FIG. 4D illustrates scan chain in which inverters are added to the scan path, and set and reset inputs of scan registers are used to increase scan chain resolution in accordance with some embodiments disclosed herein. In scan chain 416, inverters have been added to the multiplexer inputs corresponding to the "1" shift signal, and control points "C0" and "C1" have been electrically connected to the reset and set inputs of the scan registers in scan cells 402, 404, 406, and 408. The inverters and control points "C0" and "C1" can be used to increase scan chain resolution.

Figure 4E:
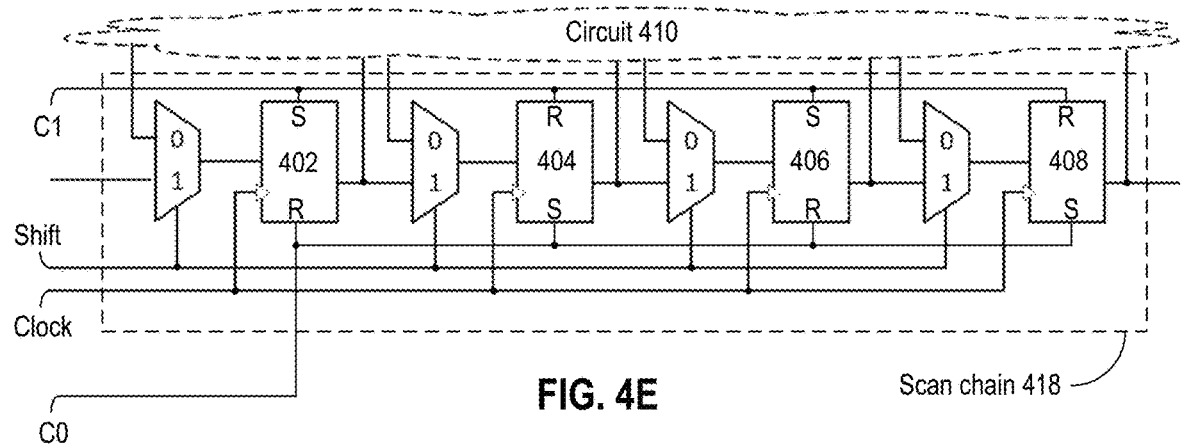

FIG. 4E illustrates scan chain in which set and reset inputs of scan registers are used to increase scan chain resolution in accordance with some embodiments disclosed herein. Control points "C0" and "C1" have been electrically connected to alternating reset and set inputs of the scan registers in scan cells 402, 404, 406, and 408. The control points "C0" and "C1" can be used to increase scan chain resolution.

In examples that include control points "C0" and "C1," one defect per scan chain can be uniquely localized using the following two-pattern test:
Pattern 1: load value <00000>, apply clock pulse for control point C0, and unload value <00000>.
Pattern 2: load value <11111>, apply clock pulse for control point C1, and unload value <11111>.

Embodiments described in FIGS. 4C-4E may be used in the test IC design scenario that does not have overhead constraints. The described design modifications achieve unique localization of one defect per scan chain for all fault types to a single scan cell. In the case of multiple scan chain defects, the embodiments guarantee localization of the defective scan cell that is closest to the scan chain output for each defective scan chain. The hardware overhead includes two global signals (C0 and C1) and two 2-input AND gates per scan cell.

In some embodiments disclosed herein may be used in a production IC design scenario that has overhead constraints. First, scan chains may be analyzed to identify those that have low chain resolution. Next, a set of design modifications may be selectively applied to improve chain resolution of the identified scan chains wherein the design modifications may include adding inverters in the scan path as well as adding control points, observe points and set/reset inputs to selected scan cells.

Specifically, the chain resolution for a circuit may be estimated based on constraints of the load values. A set of scan chains with low resolution may be confirmed by using ATPG. For example, a set of rules may be used for checking sufficient conditions for distinguishing a pair of adjacent scan cells by contradiction. More formally, a pair of scan cells may be distinguished by proving one of the adjacent scan cells is fault-free under assumption that another scan cell is faulty. For example, Rule 1 may check that (i−1)-th scan cell may receive a capture clock pulse when i-th scan cell is faulty. Rule 2 may check that (i−1)-th scan cell may capture a specific value when i-th scan cells is faulty. Rule 3 may check that load value in i-the scan cell may be propagated to another scan chain or a downstream scan cell of (i−1)-th scan cell when the (i−1)-th scan cells is faulty. Violations of these rules indicates that the scan chain has low resolution, and a design modification may be selectively performed on the scan chain to improve resolution. More formally, violations of a specific rule may be associated with a specific design modification and a cost function where the cost function measures an overhead of this specific design modification. For example, a violation of Rule 1 of (i−1)-th scan cell may be resolved by disabling clock gating to ensure a capture operation for this scan cell in the presence of chain defect in i-th scan cell. A violation of Rule 2 may be resolved by adding inverters in the scan path, and/or adding set and reset inputs for the corresponding scan cell. A violation of Rule 3 for (i−1)-th scan cell may be resolved by adding an observe point to ensure propagation of load value of this scan cell in the presence of chain defect in (i−1)-th scan cell. Note that Rule 2 and Rule 3 provide alternative mechanisms to distinguish a pair of adjacent scan cells. As a result, the violation of both rules implies that the corresponding pair of adjacent scan cells is indistinguishable. Also, resolving either Rule 2 or Rule 3 implies that the corresponding pair of adjacent scan cells is distinguished and both rules are resolved. A process of adding design modifications may continue until all rule violations are resolved or predefined overhead constraints are exceeded. In this sense, a chain resolution of the IC design may be optimized by minimizing the number of rule violations within the predefined overhead constraints.

In addition, scan chain resolution for an existing test pattern set may be calculated by using fault simulation. More formally, for each fault type, fault simulation may calculate test response for each scan cell and then compare test responses of each pair adjacent scan cells. A pair of adjacent scan cells is distinguished if the corresponding scan cells produce different test responses for at least one test pattern. Next, scan cells may be divided into classes of undistinguished scan cells, and chain resolution of each scan chain and fault type may be calculated as a ratio between the number of classes and the number of scan cells. In this manner, scan chains with low resolution may be identified.

Figure 5A:
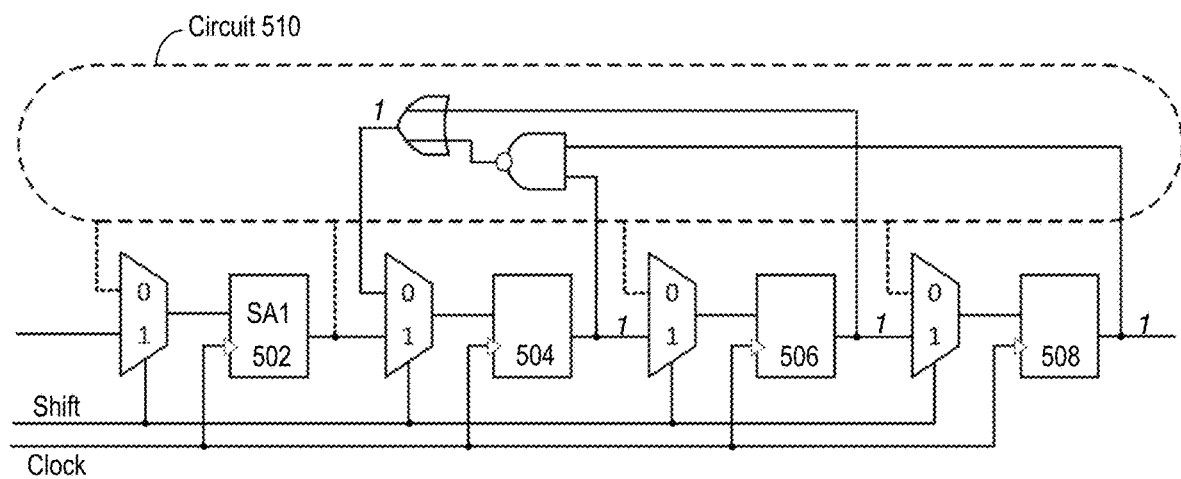
FIGS. 5A-5B illustrate selectively adding inverters to improve scan chain resolution in accordance with some embodiments disclosed herein.
Figure 5B:
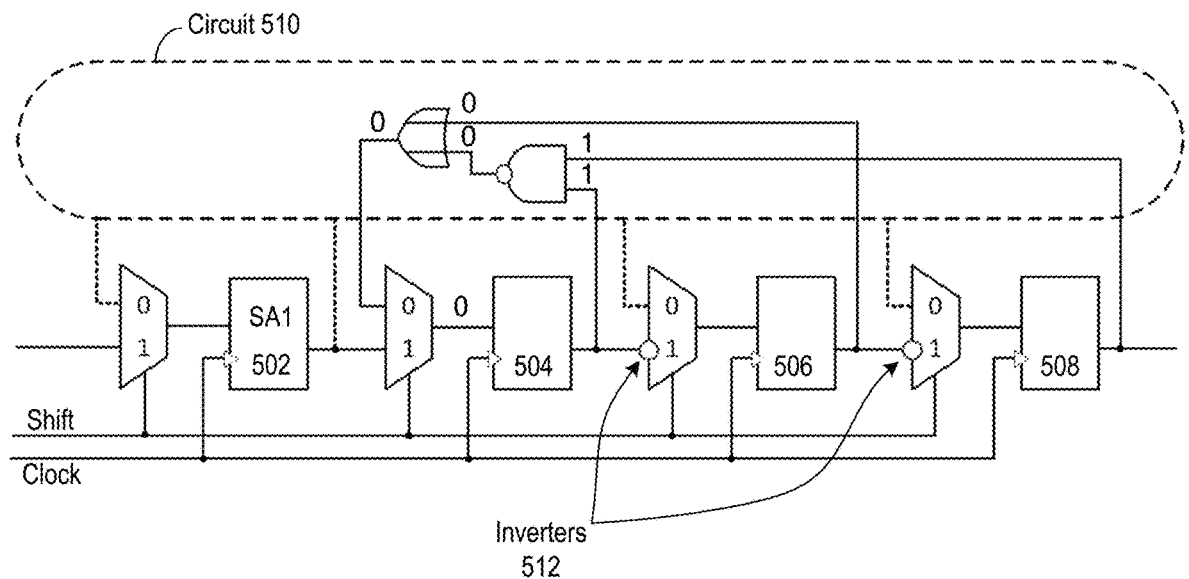

FIGS. 5A-5B illustrate selectively adding inverters to improve scan chain resolution in accordance with some embodiments disclosed herein. Scan cells 502, 504, 506, and 508 in FIG. 5A are part of a scan chain that is electrically coupled to circuit 510. When the shift signal is "0," the multiplexers in each scan cell couple an output in circuit 510 with the input of the scan register, and when the shift signal is "1," the multiplexers couple the scan cells into a chain so that values can be scanned into the scan chain or scanned out of the scan chain.

Suppose it is known that a stuck-at-1 fault exists in the scan chain, and it is desired to localize the stuck-at-1 fault to a particular scan cell. In FIG. 5A, the stuck-at-1 faults in each of scan cells 502, 504, 506, and 508 are considered equivalent or indistinguishable because they produce the same scan-outs for a given set of test patterns (although this discussion is provided in the context of a stuck-at-1 fault, a similar discussion applies, mutatis mutandis, when the fault is a stuck-at-0 fault).

During diagnosis, test patterns may be used to generate different responses to uniquely localize the faulty scan cell. For example, unloading the value 0 from scan cell 504 indicates that scan cell 504 does not have a stuck-at-1 fault. In other words, in FIG. 5A, a stuck-at-1 fault in scan cell 504 may be distinguished from a stuck-at-1 fault in scan cell 502, and scan cell 504 may be excluded from a list of potentially faulty scan cells.

An exclude condition (or E-condition) for stuck-at-1 fault in scan cell 504 cannot be satisfied in FIG. 5A because stuck-at-1 in scan cell 502 loads value 1 in scan cell 502 as well as all downstream scan cells 504, 506, and 508. As a result, the unload value from scan cell 504 is always 1.

FIG. 5B illustrates a modified scan chain in which two inverters have been added in scan path in accordance with some embodiments disclosed herein. Specifically, inverters 512 have been added between scan cells 504 and 506, and between scan cells 506 and 508. In FIG. 5B, stuck-at-1 fault in scan cell 502 loads values 1 in scan cells 504 and 508, and value 0 in scan cell 506. Thus, value 0 is captured and unloaded from scan cell 504 that indicates that scan cell 504 is fault-free. In this way, stuck-at-1 faults in a pair of adjacent scan cells 502 and 504 can be distinguished from each other, and the stuck-at-1 fault in scan cell 504 may be excluded from the initial list of potentially faulty scan cells.

In FIG. 5B, load values <X101> and unload values <X0XX> in scan cells 502, 504, 506, and 508 is the E-condition for slow-to-fall fault in scan cell 504. Additionally, load value <X101> and unload value <10XX> is the E-condition for fast-to-rise faults in scan cell 506. Stuck-at-1 fault in scan cell 504 is a proxy fault for fast-to-rise fault in scan cell 506 and slow-to-fall fault in scan cell 504 because these faults have compatible E-conditions. Likewise, load value <X010> and unload value <X1XX> is the E-condition for both stuck-at 0 fault and slow-to-rise fault in scan cell 504. Further, load value <X010> and unload value <01XX> is the E-condition for fast-to-fall fault in scan cell 506. Stuck-at-0 fault in scan cell 504 is a proxy fault for fast-to-rise fault in scan cell 506 and a slow-to-rise fault in scan cell 504 because these faults have compatible E-conditions. To summarize, the E-condition for a stuck-at-v fault in a scan cell requires unloading opposite value ~v from the scan cell where v={0,1}. Thus, in other words, the E-condition can resolve both stuck-at and delay defects.

Figure 6A:
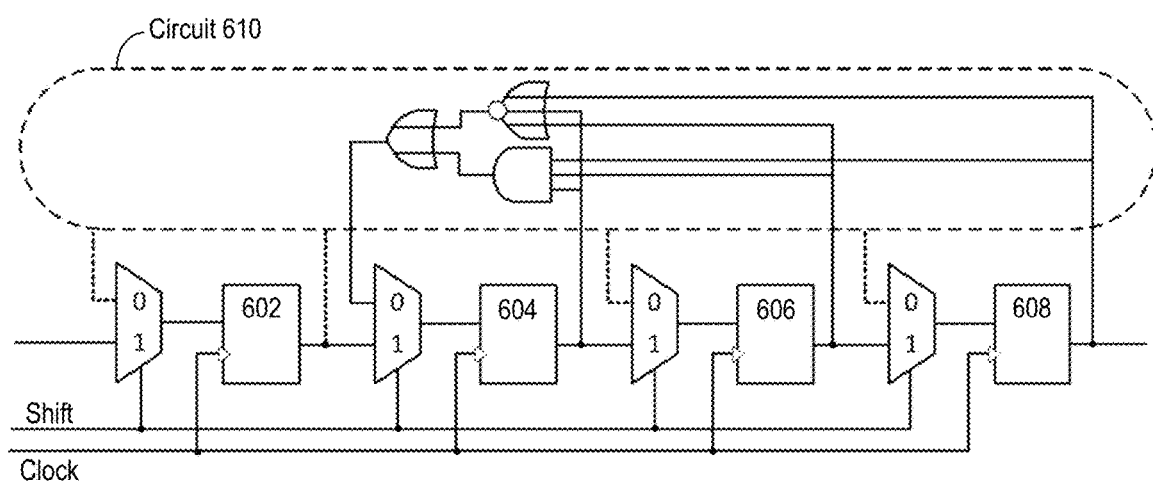
FIGS. 6A-6B illustrate selectively using a reset or set input to improve scan chain resolution in accordance with some embodiments disclosed herein.
Figure 6B:
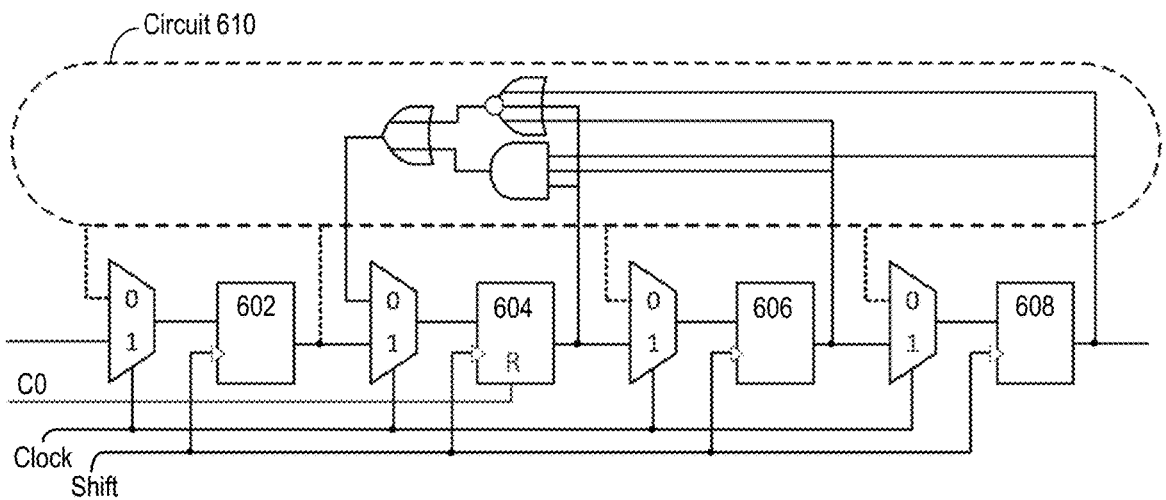

FIGS. 6A-6B illustrate selectively using a reset or set input to improve scan chain resolution in accordance with some embodiments disclosed herein. In FIG. 6A, circuit 610 is a symmetric sub-circuit which always produces the same output value for each pair of opposite input vectors. Thus, the E-conditions for both stuck-at-0 fault and stuck-at-1 fault in scan cell 604 cannot be satisfied by adding inverters in scan path. In FIG. 6B, a reset input is selectively added to scan cell 604 and controlled by control point "C0," thereby enabling the E-condition to be satisfied for a stuck-at-1 fault in scan cell 604. In other words, FIGS. 6A-6B illustrates an approach for improving scan chain resolution by selectively adding set/reset inputs, which may be used in conjunction with other approaches for improving scan chain resolution, such as selectively adding inverters in the scan path.

Figure 7A:
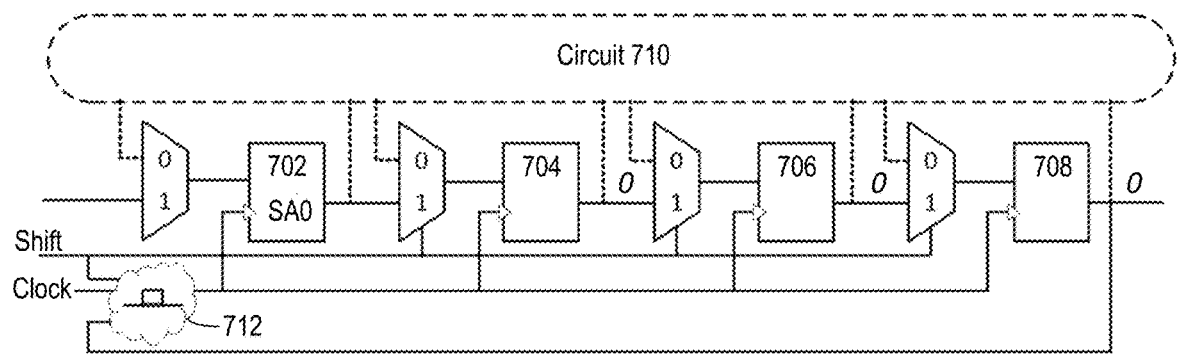
FIGS. 7A-7B illustrate selectively disabling clock gating to improve scan chain resolution in accordance with some embodiments disclosed herein.
Figure 7B:
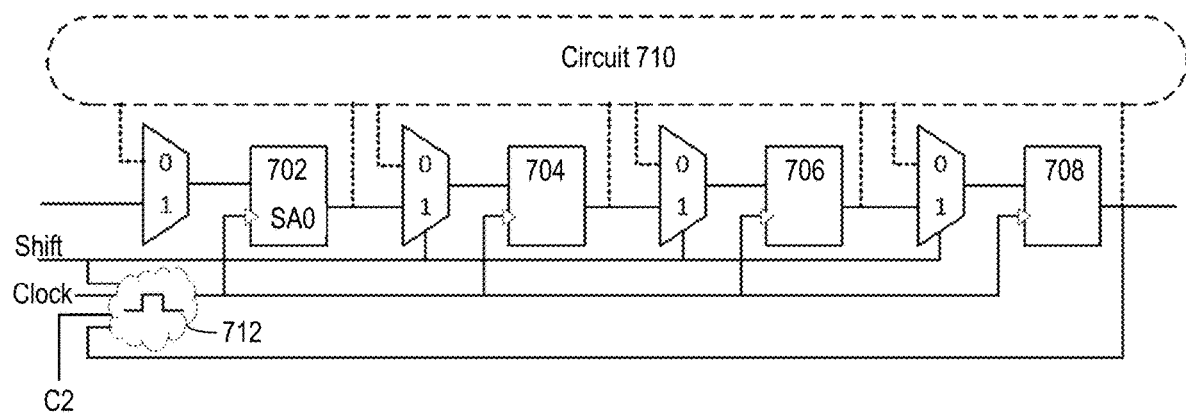

FIGS. 7A-7B illustrate selectively disabling clock gating to improve scan chain resolution in accordance with some embodiments disclosed herein. In FIG. 7A, a stuck-at-0 in scan cell 702 corrupts the load values of scan cell 702 and its downstream scan cells including scan cell 708 whose output is coupled to clock gating logic 712, and causes clock gating logic 712 to turn-off the clock to the scan cells 702, 704, 706 and 708. The load values of affected scan cells, such as scan cells 704, 706, and 708, are corrupted, and highlighted in italics in FIG. 7A. Due to the corrupted load values, the E-conditions for the affected scan cells 704, 706 and 708 cannot be satisfied because the capture operation is disabled for these scan cells. In FIG. 7B, E-conditions for the affected scan cells 704, 706 and 708 can be satisfied by adding a control point "C2" that disables clock gating logic 712 of the affected scan cells. The embodiment illustrated in FIG. 7B ensures a valid capture operation of the affected scan cells in the presence of defect in the upstream scan cells. In other words, adding a control point to disable clock gating is yet another approach for improving scan chain resolution, which may be used in conjunction with other approaches for improving scan chain resolution.

Figure 8A:
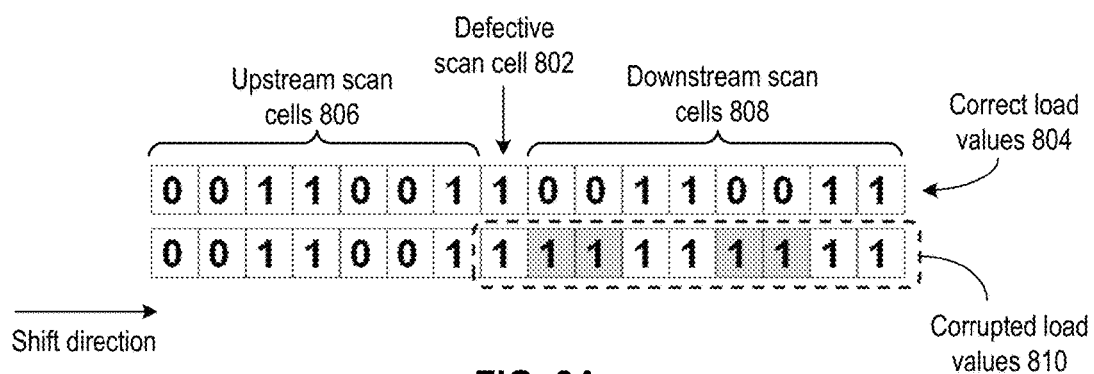

FIGS. 8A-8B illustrate a scan chain defect localization process in accordance with some embodiments disclosed herein.

In FIG. 8A, correct load values 804 may be desired to be loaded into a scan chain that includes defective scan cell 802, upstream scan cells 806, and downstream scan cells 808. A stuck-at-1 fault in defective scan cell 802 causes upstream scan cells 806 to be loaded with the correct load values, but the defective scan cell 802 and its downstream scan cells 808 are loaded with corrupted load values 810. Although all values in corrupted load values 810 are corrupted by defective scan cell 802, some of the values may be equal to the desired load values. The values that are different from the correct load values are shaded in corrupted load values 810.

In FIG. 8B, corrupted capture values 812 are captured based on the loaded values (which included some corrupted values). Corrupted unload values 814 are shifted out of the scan chain. Although all values in corrupted unload values 814 are corrupted by defective scan cell 802, some of the values may be equal to the correct capture values. The corrupted load values are not only limited to the upstream cells 806 because the corrupted load values 810 may cause incorrect capture values 816. The values that are different from the correct unload values are shaded in corrupted unload values 814.

Thus, for a given scan cell, observing both load values (0 and 1) from an upstream scan cell is evidence that the given scan cell does not have a fault where the observing is performed based on differences in test responses. Likewise, for the given scan cell, observing both unload values (0 and 1) from a downstream cell is also evidence the given scan cell does not have a fault.

FIG. 8C illustrates a process for improving resolution of a scan chain in accordance with some embodiments disclosed herein.

The process may begin by receiving an IC design which includes a scan chain, where stimulus values may be scanned-in and response values may be scanned-out through a scan path in the scan chain, where the scan path includes a first scan cell and a second scan cell, and where the first scan cell is downstream with respect to the second scan cell (at 852). Next, the process may modify the scan chain to enable observation of a 0 and a 1 value in the first scan cell in presence of a defect in the second scan cell, or observation of a 0 and a 1 value in the second scan cell in presence of a defect in the first scan cell (at 854).

Specifically, the modification may include (1) adding at least one inverter to the scan path in the scan chain so that a complement of an output of a scan cell in the scan path is provided as an input to a next scan cell in the scan path, (2) adding a control point to provide a reset signal to a register in the scan path, (3) adding a control point to provide a set signal to a register in the scan path, and/or (4) adding a control point to disable clock gating circuitry which gates a clock signal of one or more registers in the scan path. Adding at least one inverter to the scan path in the scan chain may cause a complement of an output of a scan cell in the scan path to be provided as an input to a next scan cell in the scan path. Disabling the clock gating circuitry by using the control point may ensure that the one or more registers in the scan path perform a capture operation in the presence of a defect.

Figure 9:
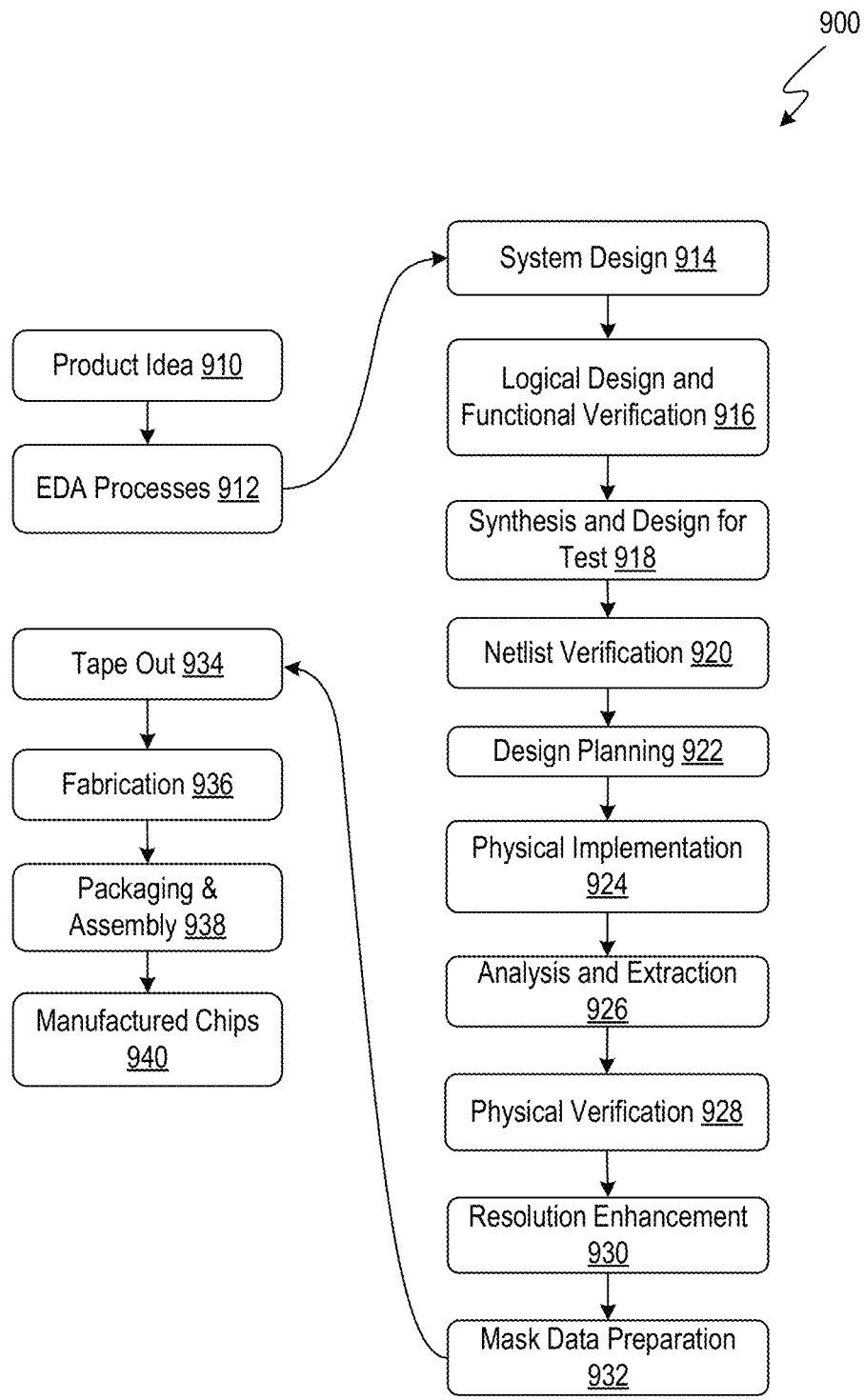
FIG. 9 illustrates an example flow for the design, verification, and fabrication of an integrated circuit in accordance with some embodiments described herein.

FIG. 9 illustrates an example flow for the design, verification, and fabrication of an integrated circuit in accordance with some embodiments described herein.

EDA processes 912 (the acronym "EDA" refers to "Electronic Design Automation") can be used to transform and verify design data and instructions that represent the integrated circuit. Each of these processes can be structured and enabled as multiple modules or operations.

Flow 900 can start with the creation of a product idea 910 with information supplied by a designer, information which is transformed and verified by using EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly 938 are performed to produce the manufactured IC chip 940.

Specifications for a circuit or electronic structure may range from low-level transistor material layouts to high-level description languages. A high-level of abstraction may be used to design circuits and systems, using a hardware description language ("HDL") such as VHDL, Verilog, SystemVerilog, SystemC, MyHDL or OpenVera. The HDL description can be transformed to a logic-level register transfer level ("RTL") description, a gate-level description, a layout-level description, or a mask-level description. Each lower abstraction level that is a less abstract description adds more detail into the design description. The lower levels of abstraction that are less abstract descriptions can be generated by a computer, derived from a design library, or created by another design automation process. An example of a specification language at a lower level of abstraction language for specifying more detailed descriptions is SPICE (which stands for "Simulation Program with Integrated Circuit Emphasis"). Descriptions at each level of abstraction contain details that are sufficient for use by the corresponding tools of that layer (e.g., a formal verification tool).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as test-bench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 in FIG. 10) may be used to store the programs and data structures that are used by some or all of the EDA products described herein, and products used for development of cells for the library and for physical and logical design that use the library.

Figure 10:
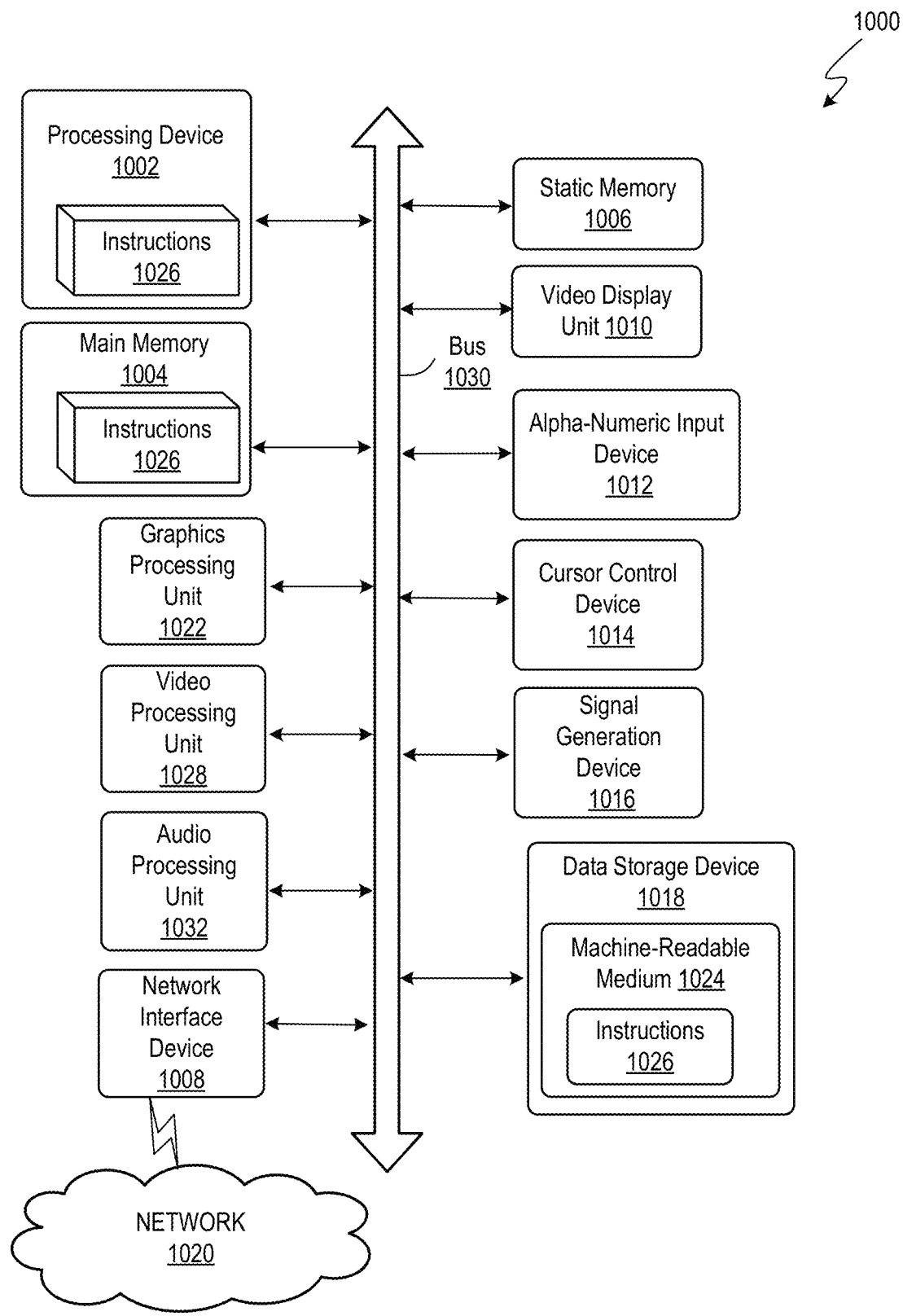
FIG. 10 illustrates an example machine of a computer system within which a set of instructions, for causing the machine to perform any one or more of the methodologies discussed herein, may be executed.

FIG. 10 illustrates an example machine of a computer system 1000 within which a set of instructions, for causing the machine to perform any one or more of the methodologies discussed herein, may be executed.

In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various design modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   receiving an integrated circuit (IC) design comprising a scan chain, wherein stimulus values are scanned-in and response values are scanned-out through a scan path in the scan chain, wherein the scan path includes a first scan cell and a second scan cell, and wherein the first scan cell is downstream with respect to the second scan cell; and
   modifying, by a processor, the scan chain to enable observation of a 0 and a 1 value in the first scan cell in presence of a defect in the second scan cell, or observation of a 0 and a 1 value in the second scan cell in presence of a defect in the first scan cell.

2. The method of claim 1, wherein the modifying comprises adding at least one inverter to the scan path in the scan chain.

3. The method of claim 1, wherein the modifying comprises adding a control point to provide a reset signal to a register in the scan path.

4. The method of claim 1, wherein the modifying comprises adding a control point to provide a set signal to a register in the scan path.

5. The method of claim 1, wherein the modifying comprises adding a control point to disable clock gating circuitry which gates a clock signal of one or more registers in the scan path, wherein disabling the clock gating circuitry ensures that the one or more registers in the scan path perform a capture operation in the presence of a scan chain defect.

6. The method of claim 1, wherein the modifying comprises:
   adding a first control point to provide a reset signal to a register in the scan path; and
   adding a second control point to provide a set signal to the register in the scan path.

7. The method of claim 1, wherein the modifying comprises adding a control point to provide a reset signal and a set signal to alternate registers in the scan path.

8. A non-transitory computer readable storage medium storing instructions, which when executed by a processor, cause the processor to:
   receive an integrated circuit (IC) design comprising a scan chain, wherein stimulus values are scanned-in and response values are scanned-out through a scan path in the scan chain, wherein the scan path includes a first scan cell and a second scan cell, and wherein the first scan cell is downstream with respect to the second scan cell; and
   modify the scan chain to enable observation of a 0 and a 1 value in the first scan cell in presence of a defect in the second scan cell, or observation of a 0 and a 1 value in the second scan cell in presence of a defect in the first scan cell.

9. The non-transitory computer readable storage medium of claim 8, wherein the modifying comprises adding at least one inverter to the scan path in the scan chain.

10. The non-transitory computer readable storage medium of claim 8, wherein the modifying comprises adding a control point to provide a reset signal to a register in the scan path.

11. The non-transitory computer readable storage medium of claim 8, wherein the modifying comprises adding a control point to provide a set signal to a register in the scan path.

12. The non-transitory computer readable storage medium of claim 8, wherein the modifying comprises adding a control point to disable clock gating circuitry which gates a clock signal of one or more registers in the scan path, wherein disabling the clock gating circuitry ensures that the one or more registers in the scan path perform a capture operation in the presence of a scan chain defect.

13. The non-transitory computer readable storage medium of claim 8, wherein the modifying comprises:
   adding a first control point to provide a reset signal to a register in the scan path; and
   adding a second control point to provide a set signal to the register in the scan path.

14. The non-transitory computer readable storage medium of claim 8, wherein the modifying comprises adding a control point to provide a reset signal and a set signal to alternate registers in the scan path.

15. An apparatus comprising:
   a memory storing instructions; and
   a processor, coupled with the memory and to execute the instructions, the instructions when executed causing the processor to:
      receive an integrated circuit (IC) design comprising a scan chain, wherein stimulus values are scanned-in and response values are scanned-out through a scan path in the scan chain, wherein the scan path includes a first scan cell and a second scan cell, and wherein the first scan cell is downstream with respect to the second scan cell; and modify the scan chain to enable observation of a 0 and a 1 value in the first scan cell in presence of a defect in the second scan cell, or observation of a 0 and a 1 value in the second scan cell in presence of a defect in the first scan cell.

16. The apparatus of claim 15, wherein the modifying comprises adding at least one inverter to the scan path in the scan chain.

17. The apparatus of claim 15, wherein the modifying comprises adding a control point to provide a reset signal to a register in the scan path.

18. The apparatus of claim 15, wherein the modifying comprises adding a control point to provide a set signal to a register in the scan path.

19. The apparatus of claim 15, wherein the modifying comprises adding a control point to disable clock gating circuitry which gates a clock signal of one or more registers in the scan path, wherein disabling the clock gating circuitry ensures that the one or more registers in the scan path perform a capture operation in the presence of a scan chain defect.

20. The apparatus of claim 15, wherein the modifying comprises:

adding a first control point to provide a reset signal to a register in the scan path; and adding a second control point to provide a set signal to the register in the scan path.

\* \* \* \* \*